United States Patent [19]

Freeman et al.

[11] Patent Number: 6,009,701
[45] Date of Patent: Jan. 4, 2000

[54] DUCTED FAN GAS TURBINE ENGINE HAVING A FRANGIBLE CONNECTION

[75] Inventors: Christopher Freeman, Nottingham; Peter G G Farrar, Derby; Martyn Richards, Burton on Trent; John W Allen, Rolleston on Dove; Kenneth F Udall, Derby; David M Beaven, Nottingham, all of United Kingdom

[73] Assignee: Rolls-Royce, PLC, London, United Kingdom

[21] Appl. No.: 08/994,652

[22] Filed: Dec. 19, 1997

[51] Int. Cl.⁷ ................................ F01D 25/16; F01D 5/02
[52] U.S. Cl. ...................... 60/223; 60/226.1; 60/39.091; 415/9; 415/119; 415/229; 384/624
[58] Field of Search .............................. 60/39.31, 39.091, 60/223, 226.1; 384/624; 415/9, 119, 229; 416/2, 170 R

[56] References Cited

U.S. PATENT DOCUMENTS

| | | | |
|---|---|---|---|
| 3,727,998 | 4/1973 | Haworth et al. | 416/170 R |
| 4,193,741 | 3/1980 | Briggs | 60/39.091 |
| 4,201,513 | 5/1980 | Sales | 60/226.1 |
| 4,452,567 | 6/1984 | Treby et al. | 416/2 |
| 4,475,869 | 10/1984 | Davies | 416/170 R |
| 5,433,584 | 7/1995 | Amin et al. | 415/9 |

FOREIGN PATENT DOCUMENTS

| | | |
|---|---|---|
| 1427339 | 3/1976 | United Kingdom . |
| 2058245A | 4/1981 | United Kingdom . |
| 2079402A | 1/1982 | United Kingdom . |
| 2130340A | 5/1984 | United Kingdom . |
| 2281105A | 2/1995 | United Kingdom . |

*Primary Examiner*—Ted Kim
*Attorney, Agent, or Firm*—W. Warren Taltavull; Farkas & Manelli

[57] ABSTRACT

A ducted fan gas turbine engine is provided with a fan which is carried by a shaft. A frangible fuse ring maintains the shaft carrying the fan coaxial with the engine longitudinal axis. In the event of severe fan damage, the fuse ring (28) fractures and the fan shaft orbits about the engine longitudinal axis. A pair of threaded members (39, 41), one of which is of generally frusto-conical configuration, cooperate as a result of the orbiting motion to restore the coaxial relationship between the fan shaft and the engine longitudinal axis.

9 Claims, 4 Drawing Sheets

DUCTED FAN GAS TURBINE ENGINE HAVING A FRANGIBLE CONNECTION

This invention relates to a ducted fan gas turbine engine and is particularly concerned with the preservation of the integrity of such an engine following damage to its fan.

Ducted fan gas turbine engines conventionally comprise a core engine which drives a comparatively large diameter propulsive fan positioned at the upstream end of the core engine. The fan is thus vulnerable to damage as a result of foreign object ingestion by the engine. In most cases, the fan is sufficiently robust to withstand the effects of such foreign object ingestion without suffering major damage and is able to continue operating, although, perhaps, at reduced efficiency.

On very rare occasions, the fan may be damaged to such an extent that parts of one or more of the aerofoil blades that make up the fan are lost. This usually necessitates the shutting-down of the engine involved to minimize the hazard to the aircraft carrying it. However, the imbalance in the fan created by the blade loss generates extremely high loads which must be at least partially absorbed as the engine is run-down to windmilling speed. Windmilling speed is the speed at which the engine rotates in a non-operative condition as a result of its motion through the atmosphere.

One way in which fan imbalance load absorption can be achieved is by the use of so-called "fuse pins". Typically the main bearing supporting the shaft carrying the fan is radially connected to the remainder of the engine structure via a plurality of axially extending fuse pins. In the event of major fan imbalance, the resultant high radial loads cause the fuse pins to fracture in shear and allow the fan and its shaft to orbit about the engine's longitudinal axis. This continues as the engine is allowed to run down to windmilling speed. Such arrangements are disclosed in GB2079402 and GB2130340.

Unfortunately, under certain circumstances, the vibration resulting from fan imbalance that still exists at windmilling speed can still be extremely severe. This is due mainly to the natural frequency of vibration of the fan and the reduced radial stiffness of the fused structure supporting the fan assembly.

It is an object of the present invention to provide a ducted fan gas turbine engine in which such fan assembly radial stiffness is restored at windmilling speeds following the fracture of the fuse pins or other fused structure.

According to the present invention, a ducted fan gas turbine engine having a longitudinal axis includes a propulsive fan mounted on a shaft, which shaft is normally coaxial with said engine longitudinal axis, said fan shaft being radially supported by a bearing structure which is in turn supported from fixed structure of said engine by radially frangible connection means, restoration means being provided to exert radial forces upon said fan shaft bearing support structure to substantially restore the coaxial relationship between said fan shaft and said engine longitudinal axis subsequent to any radial excursion of at least part of said fan shaft relative to said engine longitudinal axis following the fracture of said frangible support means, said restoration means comprising first and second cooperating threaded members, one of said threaded members being internally threaded and the other being externally threaded, said first threaded member being mounted on said fan shaft bearing support structure coaxially with said fan shaft for rotational and axial motion relative to said support structure and said second threaded member being fixedly mounted on said fixed structure of said engine coaxially with said engine longitudinal axis, one of said threaded members having a shorter thread of generally constant diameter, the other having a longer thread of progressively decreasing diameter in the direction of said engine longitudinal axis, from a diameter greater than that of the other of said threaded members to a diameter substantially equal to that of the other of said threaded members at least part of the thread of said threaded member having a shorter thread being axially aligned with the larger diameter portion of the thread of said other threaded member prior to said any radial excursion of at least part of said fan shaft.

The present invention will now be described, by way of example, with reference to the accompanying drawings in which.

Figure 1:
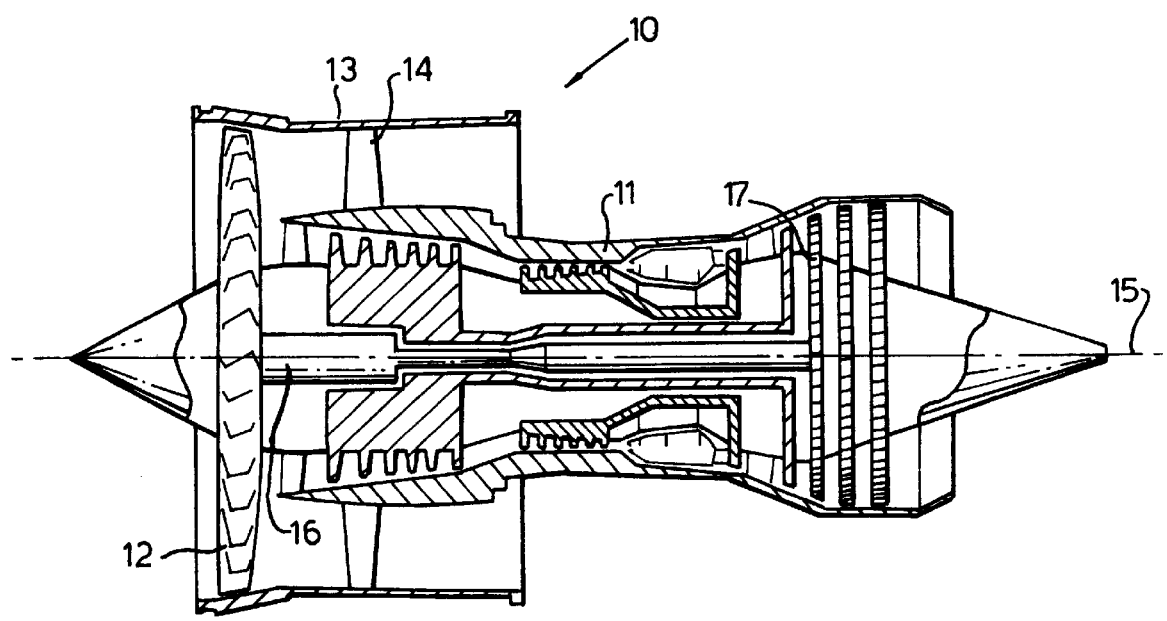
FIG. 1 is a schematic sectioned side view of a ducted fan gas turbine engine in accordance with the present invention.

With reference to FIG. 1, a ducted fan gas turbine engine generally indicated at 10 is of mainly conventional construction. It comprises a core engine 11 which functions in the conventional manner to drive a propulsive fan 12 positioned at the upstream end of the core engine 11 (the term "upstream" as used herein is with respect to the general direction of gas flow through the engine 10, that is, from left to right as viewed in FIG. 1). The propulsive fan 12 is positioned within a fan casing 13 which supported from the core engine 11 by an annular array of outlet guide vanes 14. The ducted fan gas turbine engine 10 has a longitudinal axis 15 about which its major rotational parts rotate.

The fan 12 is mounted on a shaft 16 which under normal circumstances, is coaxial with the engine longitudinal axis 15 and which is driven in the conventional manner by the low pressure turbine portion 17 of the core engine 11. The manner in which the upstream region of the fan shaft 16 is supported from the fixed structure of the engine 10 can be seen if reference is now made to FIG. 2.

The fan shaft 16 supports a stub shaft 18 which in turn carries the fan 12 on its radially outer surface in the conventional manner. The stub shaft 18 also serves to define the radially inner track of a roller bearing 19. The radially outer track 20 of the roller bearing 19 is supported by a flanged ring 21 which is, in turn, supported by fixed structure 22 of the core engine 11.

The radially outer bearing track 20 seats against a radially inwardly directed flange 23 provided on the downstream end of the flanged ring 21. A generally L-shaped clamping ring 24, which is attached by bolts 25 to the upstream end of the flanged ring 21, maintains the radially outer bearing track 20 in position on the flanged ring 21.

A radially outwardly directed flange 26 provided on the downstream end of the flanged ring 21 defines a radial face 27 which abuts a corresponding radial face 28 provided on the core engine fixed structure 22. Relative radial movement between the flanged ring 21 and the core engine fixed structure 22 is prevented by a frangible fuse ring (29), which is retained in suitably positioned aligned angular slots 30 and 31 located respectively in the flanged ring 21 and the core engine fixed structure 22.

In the event of the fan 12 suffering damage which places it significantly out-of-balance, considerable radial loads are transmitted from the fan shaft 16 to the flanged 21 ring via the roller bearing 19. Those loads are then in turn transmitted to the core engine fixed structure 22 via the fuse ring 29. However, in order to protect the core engine 11 from being seriously damaged by the loads, the fuse ring 29 is designed so as to be frangible in such a manner that if fractures in shear when subjected to loads above a pre-determined magnitude. Since the upstream end of the fan shaft 16 no longer has radial support following fracture of the fuse ring 29, it proceeds to orbit around the engine longitudinal axis 15. This, in turn, results in the flanged ring 21 following that orbiting motion, so sliding radially relative to the core engine fixed structure 22.

In order to ensure that there is no axial movement of the flanged ring 21 while it orbits, an annular guide member 32 is attached to the core engine fixed structure 22 by bolts 42. The guide member cooperates with the face 28 of the core engine fixed structure 22 to define an annular, radially directed slot 33 within which the radially outwardly directed flange 26 is free to slide. A protective sheath 34 is provided on the flange 26 to facilitate such sliding. The radially directed slot 33 may, if desired, contain a suitable energy absorption material in order to assist in the absorption of energy released by the out-of-balance rotation of the fan 12 and thereby limit the degree of possible damage to the remainder of the core engine 11.

Conventionally, the fuel flow to the engine 10 is discontinued and the fan 12 is allowed to run down to windmilling speed following major fan damage. However, at windmilling speeds, there is a likelihood of the fan 12 approaching its natural frequency for the fused structure support stiffness. This can result in the fan 12 vibrating to such an extent that the integrity of the engine 10 or aircraft carrying the engine is threatened.

In order to alter the natural frequency of the fan 12 under these circumstances, the rotational axis of the fan 12 is brought back into coaxial relationship with the engine longitudinal axis 15 so that the overall stiffness of the core engine 11 is restored. This is achieved by the application of a radial restoration force to the fan shaft 16.

The radial restoration force is applied to the fan shaft 16 via the flanged ring 21 and the bearing 19. More specifically, the radially outer surface 35 of the flanged ring 21 defines a plain, cylindrical bearing surface which carries an annular bearing element 36. The radially outer surface 37 of the annular bearing element 36 is convexly curved to receive the correspondingly concavely curved radially inner surface 38 of a first threaded member 39 although these features may not always be necessary. The first threaded member 39 is hollow, generally helically directed and of generally triangular cross-sectional shape. However, it may be desirable under certain circumstances for the first threaded member to be solid and of an approximately different cross-sectional configuration. Its axial extent is at least one pitch of the thread which it defines so that one end of the first threaded member 39 is axially aligned with, but axially offset from, its other end.

The radially outer extent 40 of the first threaded member 39 engages a second threaded member 41 which is an integral part of the annular guide member 32. The second threaded member 41 is thus fixed relative to the core engine fixed structure 22. Although in this particular case, the second threaded member 41 is shown as being an integral part of the annular guide member 32, this is not in fact essential. The important feature is that the second threaded member 41 is fixed relative to the core engine fixed structure 22.

Figure 2:
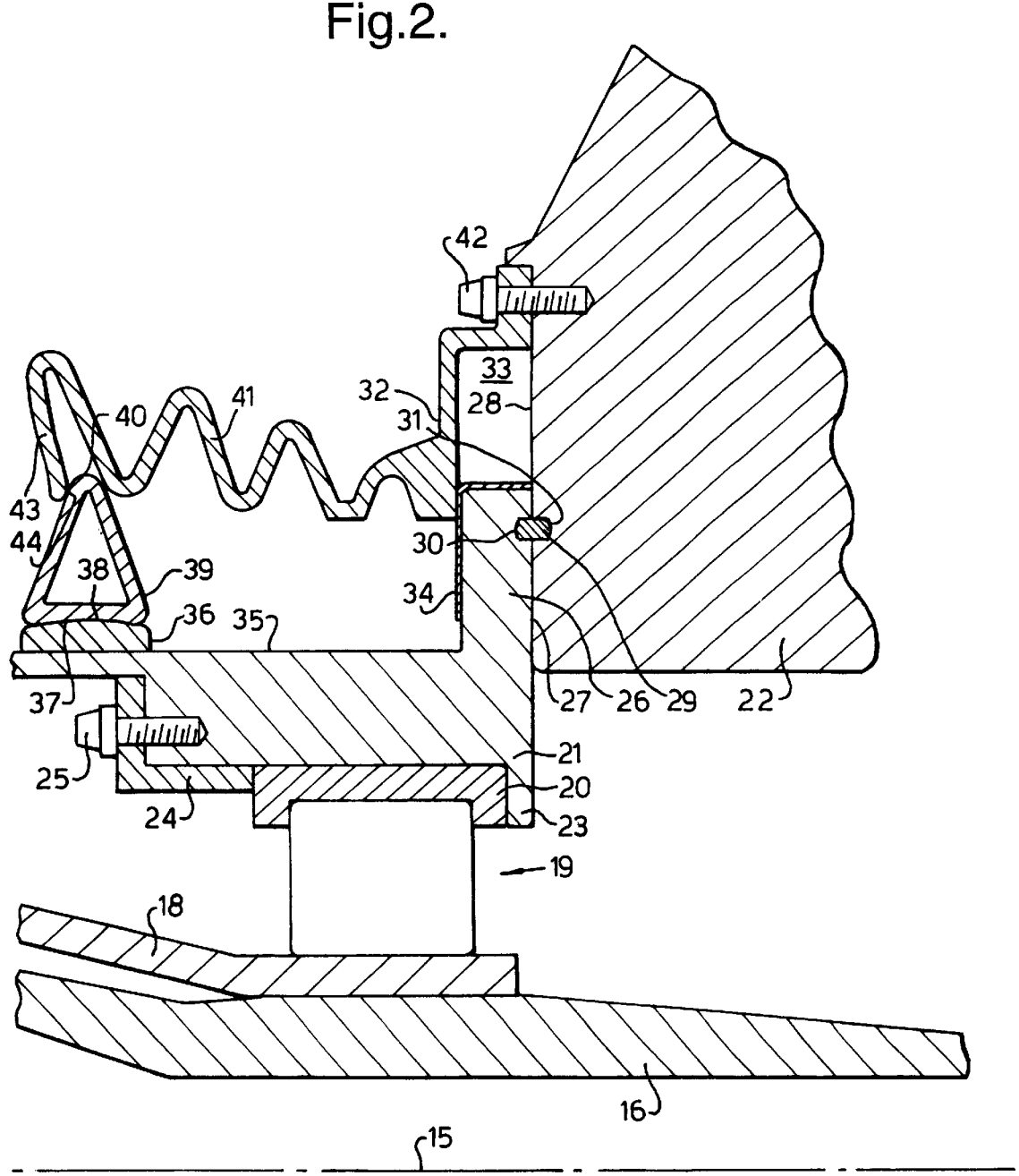
FIG. 2 is a sectioned side view of a part of the bearing support structure for the upstream end of the fan shaft of the ducted fan gas turbine engine shown in FIG. 1.

The second threaded member 41 is so configured as to define a thread which is of progressively decreasing diameter in the direction from left to right when viewed in FIG. 2 so as to be of generally frusto-conical configuration. The smallest diameter of the second threaded member 41, that is, at its right hand end adjacent the annular guide member 32, is of the same diameter as that of first threaded member 39.

The largest diameter portion of the second threaded member 41 is of such magnitude that under normal operating conditions, there is a limited degree of interconnection between it and the first threaded member 39 as can be seen in FIG. 2. The free end 43 of the second threaded member 41 is arranged to be resilient and deformed in a generally axial direction so that the second threaded member 41 effectively grips the first threaded member 39. A keyway cut into the first threaded member 39 is positioned so as to receive a key 44 on the second threaded member, 41. The key 44, and the configuration of the free end 43 of the second threaded member 41, ensure that under normal operating conditions, the first and second threaded members 39 and 41 are maintained in a fixed positional relationship with respect to each other. An alternative method of maintaining this relationship is the provision of soft fusible rivets, or similar, connecting the first and second threaded members, 39 and 41, in the region of the key 44.

Following the previously mentioned fan damage and the subsequent orbiting of the fan shaft 16, the flanged ring 21, and consequently the first threaded member 39 mounted upon it, also proceed to orbit about the engine longitudinal axis 15. Since the second threaded member 41 is positionally fixed relative to the fixed core engine structure 22, the orbiting motion of the first threaded member 39 results in the retainment function of the key 44 and the resilient free end 43 of the second threaded member free end 43 being overcome. As a result, the first threaded member 39 is free to engage the full radial extent of the thread of the second threaded member 41.

Since the first threaded member 39 is now free to move relative to the flanged ring 21 on the bearing elements 35 and 36, it proceeds to roll along the thread of the second bearing member 41. The second threaded member 41 thus limits the orbiting motion of the fan shaft 16.

Although the diameter of the second threaded member 41 progressively decreases in the direction left to right as viewed in FIG. 2, its diameter is always the same as or greater than that of the first threaded member 39. Consequently, the first threaded member 39 precesses, so that for a clockwise orbit of the first threaded member 39, the first threaded member 39 rotates slowly in an anti-clockwise direction and vice versa. The actual speed of rotation of the first threaded member 39 is determined by the local difference in diameter between the radii of the first and second threaded members 39 and 41. Thus the greater the difference in diameter, the faster the first threaded member 39 will rotate for given orbiting speed of the fan shaft 16.

The threads of the first and second threaded members 39 and 41 are of such a hand that as the fan shaft 16 orbits about the engine longitudinal axis 15, the first threaded member 39 translates axially in the direction left to right when viewed in FIG. 2 relative to the second threaded member 41. It also translates axially relative to the flanged ring 21. However, since the diameter of the second threaded member 41 progressively decreases in that direction, the speed of rotation of the first threaded member 39, and hence its rate of axial translation, also progressively decreases.

Figure 3:
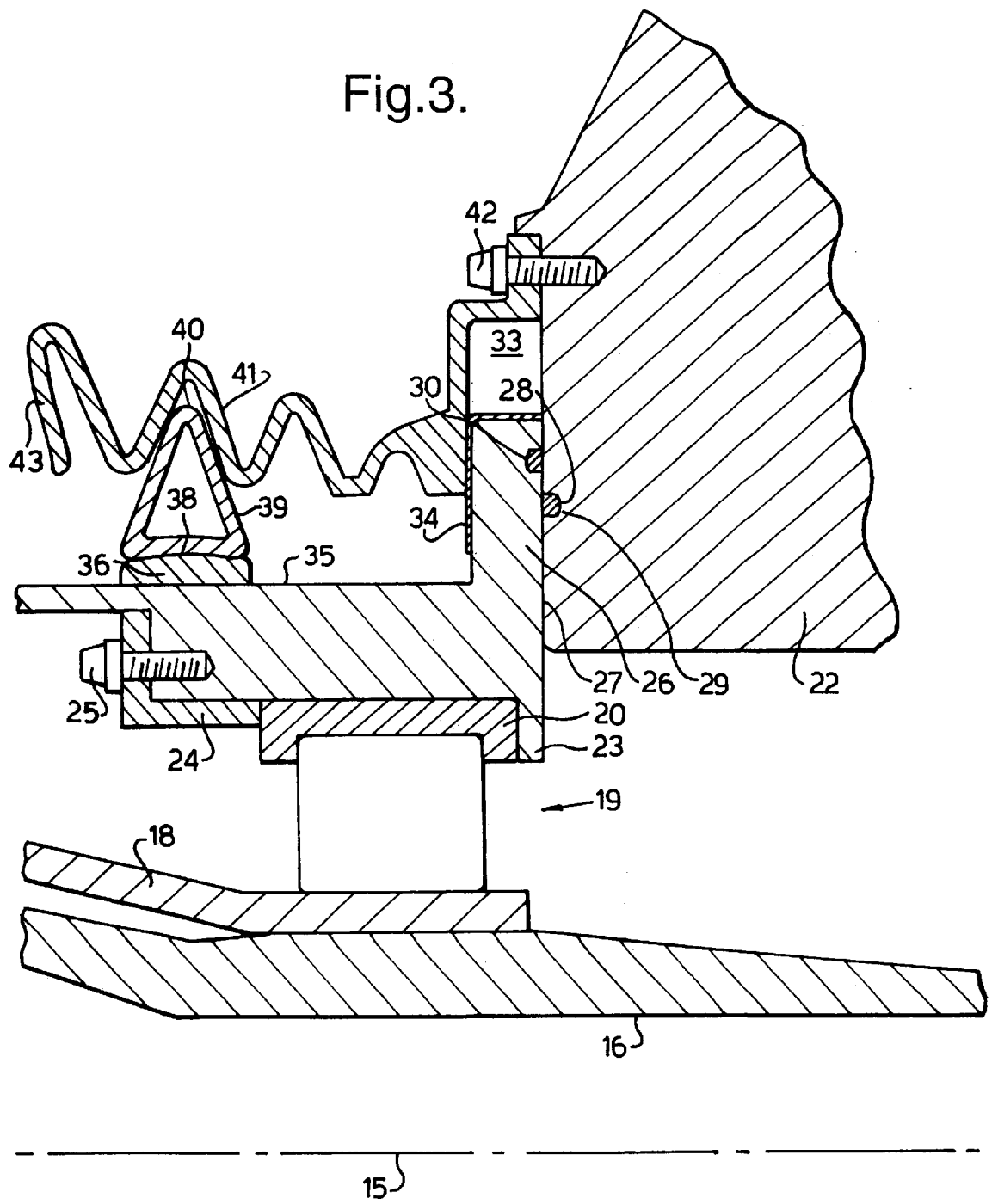
FIG. 3 is view similar to that shown in FIG. 2 shortly after the failure of the fan of that engine.
Figure 4:
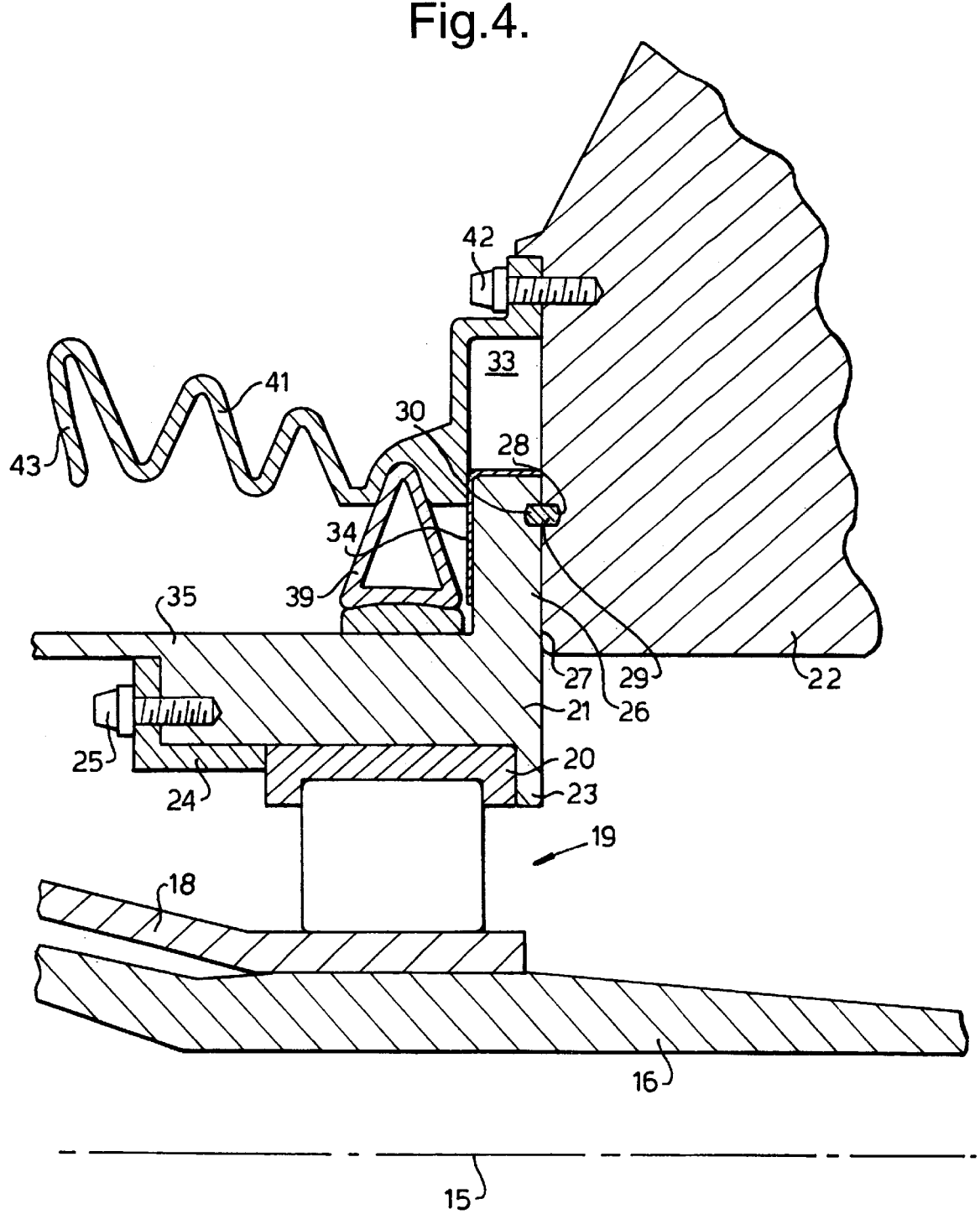
FIG. 4 is a view similar to that shown in FIG. 3 following the elapse of a short time period.

Thus the first threaded member 39 will, following fan 12 damage, progressively translate axially along the bearing surface 35 of the flanged ring 21 through the position shown in FIG. 3 until it is stopped by the radial interference of the threaded members 39 and 41, with the bearing element 36 close to the flange 26 as shown in FIG. 4. At this point, the internal diameter of the thread of the second threaded member 41 matches that of the external diameter of the thread on the first threaded member 39. As the first threaded member 39 so translates, it progressively decreases the orbiting diameter of the flanged ring 21 and hence that of the fan shaft 16. Additionally, rate of axial translation of the first threaded member 39 progressively decreases as the orbiting diameter decreases. Eventually, when the first threaded member 39 reaches the position shown in FIG. 4, its orbiting motion is virtually eliminated. At this point, the stiffness of the whole assembly is re-established, so in turn altering the natural frequency of the fan 12. The fan 12 thus ceases to vibrate at what was its natural frequency. Consequently, the fan 12 is free to continue windmilling without exhibiting undesirable vibrational characteristics.

It will be seen therefore that the present invention provides a means for permitting the fan shaft 16 to orbit while it runs down to windmilling speed following major fan damage but which stops that orbiting at windmilling speeds, thereby avoiding undesirable vibration from the fan 12.

Although the present invention has been described with respect to a ducted fan gas turbine engine in which the slidable first threaded member 39 is mounted on structure supporting the fan shaft 16 and the second threaded member 41 of axially reducing diameter mounted on fixed engine structure, it will be appreciated that this is not in fact essential. Consequently it may be desirable under certain circumstances to mount the first threaded member 39 on fixed engine structure and the second threaded member 41 on structure supporting the fan shaft 16.

We claim:

1. A ducted fan gas turbine engine having a longitudinal axis including a fixed structure, a propulsive fan mounted on a shaft, which shaft is normally coaxial with said engine longitudinal axis, a bearing structure, said fan shaft being radially supported by said bearing structure which is in turn supported from said fixed structure of said engine by radially frangible connection means, and restoration means to exert radial forces upon said fan shaft bearing support structure to substantially restore the coaxial relationship between said fan shaft and said engine longitudinal axis subsequent to any radial excursion of at least part of said fan shaft relative to said engine longitudinal axis following fracture of said frangible support means, said restoration means comprising first and second cooperating threaded members, one of said threaded members being externally threaded and the other being internally threaded, said first threaded member being mounted on said fan shaft bearing support structure coaxially with said fan shaft for rotational and axial motion relative to said support structure and said second threaded member being fixedly mounted on said fixed structure of said engine coaxially with said engine longitudinal axis, one of said threaded members having a shorter thread of generally constant diameter, the other having a longer thread of progressively decreasing diameter in a direction of said engine longitudinal axis, from a diameter greater than that of the other of said threaded members to a diameter substantially equal to that of the other of said threaded members, at least part of the thread of said threaded member having a shorter thread being axially aligned with the larger diameter portion of the thread of said other threaded member prior to said any radial excursion of at least part of said fan shaft.

2. A ducted fan gas turbine engine as claimed in claim 1 wherein said threaded member having a thread of progressively decreasing diameter is the threaded member which is internally threaded.

3. A ducted fan gas turbine engine as claimed in claim 1 wherein said threaded member having a thread of progressively decreasing diameter is said second threaded member.

4. A ducted fan gas turbine engine as claimed in claim 1 wherein an axial extent of said threaded member having a thread of generally constant diameter is approximately equal to one pitch of said thread of generally constant diameter.

5. A ducted fan gas turbine engine as claimed in claim 1 wherein means are provided to interconnect said first and second threaded members and maintain them in a pre-determined relationship only prior to any fracture of said frangible support means.

6. A ducted fan gas turbine engine as claimed in claim 5 wherein said means to maintain said first and second threaded members in said pre-determined relationship comprises a resilient portion at a larger diameter end of said threaded member of progressively decreasing diameter, said resilient portion being configured to grip said one of said threaded members having a generally constant diameter only prior to any fracture of said frangible support means.

7. A ducted fan gas turbine engine as claimed in claim 6 wherein said means to maintain said first and second threaded members in said pre-determined relationship comprises a key in said second threaded member, said first threaded member being provided with a cooperating keyway to receive said key.

8. A ducted fan gas turbine engine as claimed in claim 1 wherein said fan shaft bearing support structure defines said bearing surface on which said first threaded member is axially and rotationally movable.

9. A ducted fan gas turbine engine as claimed in claim 1 wherein said second threaded member is fixedly mounted on said fixed engine structure at a part which includes its smallest diameter threaded portion.

* * * * *